United States Patent
Marlatt

(10) Patent No.: US 7,159,065 B1
(45) Date of Patent: Jan. 2, 2007

(54) METHOD FOR ISSUING VENDOR SPECIFIC REQUESTS FOR ACCESSING ASIC CONFIGURATION AND DESCRIPTOR MEMORY WHILE STILL USING A MASS STORAGE CLASS DRIVER

(75) Inventor: Teri L. Marlatt, Meridian, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 342 days.

(21) Appl. No.: 10/177,545

(22) Filed: Jun. 20, 2002

(51) Int. Cl.
*G06F 13/20* (2006.01)

(52) U.S. Cl. ............ 710/313; 710/305; 710/306; 710/100; 710/311

(58) Field of Classification Search .......... 710/313, 710/305–306, 8, 100, 311; 713/176, 168
See application file for complete search history.

(56) References Cited

U.S. PATENT DOCUMENTS

| | | | |
|---|---|---|---|
| 6,484,219 B1* | 11/2002 | Dunn et al. ............ | 710/42 |
| 6,493,770 B1* | 12/2002 | Sartore et al. ......... | 710/8 |
| 6,618,788 B1* | 9/2003 | Jacobs .................... | 710/315 |
| 6,697,944 B1* | 2/2004 | Jones et al. ............ | 713/168 |
| 6,802,004 B1* | 10/2004 | Gross et al. ........... | 713/176 |
| 2002/0133694 A1* | 9/2002 | Ray et al. ............... | 713/1 |
| 2002/0144115 A1* | 10/2002 | Lemay et al. .......... | 713/168 |
| 2003/0135842 A1* | 7/2003 | Frey et al. .............. | 717/121 |
| 2003/0167395 A1* | 9/2003 | Chang et al. ........... | 713/183 |

OTHER PUBLICATIONS

ATA/ATAPI-6, NCITS Draft Specification Revision 3a (included as CD ROM)
Universal Serial Bus Specification Version 2.0 (included as CD ROM).
Universal Serial Bus Mass Storage Class-Bulk-Only Transport Specification Revision 1.0 (included as CD ROM).
ATA/ATAPI-6, NCITS Draft Specification Revision 3a.
Universal Serial Bus Specification Version 2.0.
Universal Serial Bus Mass Storage Class-Bulk-Only Transport Specification Revision 1.0.

* cited by examiner

*Primary Examiner*—Rehana Perveen
*Assistant Examiner*—Kim T. Huynh
(74) *Attorney, Agent, or Firm*—Marger Johnson & McCollom, PC

(57) ABSTRACT

A bridge-chip may interface a Universal Serial Bus to a mass storage device. Communications of the universal serial bus may be examined to determine a command block wrapper (CBW) of a bulk transport protocol and if a configuration command block (CFGCB) of the CBW may include a signature associated with the bridge-chip. A command of the CFGCB might then be performed by the bridge-chip upon determining the signature. This procedure might be used to get or set configuration or descriptor data of the bridge-chip separate from other USB configurations operations.

24 Claims, 3 Drawing Sheets

METHOD FOR ISSUING VENDOR SPECIFIC REQUESTS FOR ACCESSING ASIC CONFIGURATION AND DESCRIPTOR MEMORY WHILE STILL USING A MASS STORAGE CLASS DRIVER

BACKGROUND

The present invention relates to a bridging device and its method of access. More particularly, the present invention may be related to accessing descriptor and/or configuration information of a bridge-chip using a mass storage class driver protocol.

The Universal Serial Bus specification (e.g., version 1.0 or 2.0), available from the American National Standards Institute (ANSI), hereby incorporated by reference, establishes architectures and standards for communicating between a computer and peripheral(s) over a serial transmission interconnect. Examples of peripherals may include, e.g., keyboards, mouse, monitor, printer, scanner and/or removable hard drives. The communications of the USB interface may be isochronous or asynchronous. The USB interface may also distribute power to the peripherals.

Some mass storage devices may have an interface that is different from the USB standard. For example, the ATA/ATAPI-6, NCITS Draft specification (e.g., T13/1410D of Revision 3A of Dec. 14, 2001) available from ANSI and hereby incorporated by reference, establishes protocols of an ATA (Advanced Technology Attachment) or ATAPI (ATA packet Interface) type interface. The ATA/ATAPI specification addresses how to pass commands to a storage device and how these commands might be interpreted.

ATA type storage devices may include, for example, hard drives or removable media drives—e.g., disk drives, flash memory card interfaces, micro-drives and the like. Strict ATA type devices may not support packet-type transfers. ATAPI type storage devices, on the other hand, may support packet interfacing. Such devices may include, for example, CD-ROMs, CD-Recordable, CD-RW, DVD, tape drives, super-floppy drives, some ZIP drives and the like.

In some data processing systems, a bridge-chip may translate a protocol of one bus to that of another. For example, a bridge-chip may receive USB communications from a host and may translate the USB communications into ATA/ATAPI commands for accessing an ATA or ATAPI type storage. The bridge-chip might also serve to translate in a reverse direction from the ATA/ATAPI interface to the USB.

A logical pipe may be preconfigured during a USB device initialization procedure between a master and slave. When a USB device, e.g., a mouse or keyboard, is initially attached to the USB bus and powered-up, the device may communicate configuration, status and control information. The host may establish a functionality and unique USB address for the newly attached USB device and may obtain the USB "descriptor" and "configuration" information of the attached USB device.

The mass storage class devices handle large amounts of data. For example, a scanner may generate a large data file, which may then need to be transferred to a memory or other subsystem. Likewise, the memory may contain a large data file, which may then need to be transferred to a processor or directly to a printer. When transferring the large data files, the mass storage devices may use bulk transfer protocols to assist in reliability of the bulk transfers.

Generally, referencing FIGS. 1–2, a host 10 may include an Operating System (OS) 200 capable of accessing a mass storage device 14 (e.g., of an ATA/ATAPI type device) over a USB bus 16. The host may comprise an OS Basic Input/Output System (BIOS) with a library of routines available to launch commands or transport applications from its controller to an end device such as a mass storage device 14 (of FIG. 1). Likewise, the mass storage device may have software (e.g., client software) 212, which may help the host coordinate communications.

In FIG. 2, an actual physical link 224 is represented by a solid line. Dashed lines 216 and 220 may be representative of logical communication paths to respective levels of an external device (not shown).

Conventionally, USB descriptor and/or configuration information may be obtained from a bridge chip during configuration of the USB bus and using protocols of the USB specification. Further referencing FIG. 1, bridge-chip 12 may include chip configuration data that is specific to the IC. The chip configuration data may include information of, e.g., power requirements, mode of operation, particular vendor lot number, options being implemented, programmability, etc., that may be specific to the bridge-chip. The bridge-chip may access the chip configuration data and the USB descriptor data through a memory device, such as, e.g., an on-chip ROM, on-chip RAM, external EEPROM, etc.

Conventionally, referencing FIG. 2, the USB descriptor data may be accessed by way of a USB driver 218 of host 200. The information may be obtained from the bridge-chip using the conventional USB-Device-Request, e.g., GET_DESCRIPTOR, through a USB control pipe 220. The chip configuration data of the bridge-chip conventionally would be accessed by issuing Vendor Specific (CFG-READ, CFG-_LOAD) USB Device Requests through the USB control pipe 220. However, accessing this bridge-chip configuration and descriptor data through use of USB Device Requests conventionally required a vendor specific driver 214 that might be provided with the client software. The vendor specific driver 214 might then know how to issue requests for the bridge-chip's information.

It is recognized herein, that there may be advantages in allowing access of the bridge-chip's configuration and descriptor data without need of a vendor specific driver.

SUMMARY

In accordance with an exemplary embodiment of the present invention, chip configuration and descriptor data may be accessed by embedding commands and information that the chip may need within a Mass Storage Class Command Block Wrapper (CBW) of an already established and available Mass Storage Class protocol of an operating system.

In one embodiment, a method of operating a bridge-chip comprises receiving communications from a Universal Serial Bus. The USB communications may be examined to determine a configuration code block (CFGCB) of a CBW and if it includes a signature associated with the bridge-chip. In a further embodiment, a command of the CFGCB may be executed by the bridge-chip dependent on determining the signature.

In a further embodiment, a mass storage class driver, of a bulk transport protocol, configures a CBW with the CFGCB.

In another embodiment, a storage interface comprises a universal serial bus and a driver to drive the universal serial bus. A bridge-chip may be configured to translate communications of the universal serial bus to protocols of a mass storage device. The driver may be operable to structure CBW's of a bulk only transport protocol and may configure CFGCB's including a vendor specific signature of the bridge-chip.

In a further embodiment, the driver is operable to embed a command of the group consisting of a configuration load, a configuration read or a descriptor request within the CFGCB. The bridge-chip may be operable to interpret and execute the command and to read or load the configuration or descriptor data dependent on the embedded command.

BRIEF DESCRIPTION OF DRAWINGS

The present disclosure may be best understood with reference to the accompanying drawings as identified below.

DETAILED DESCRIPTION

In the following description, numerous specific details are set forth to provide an understanding of exemplary embodiments of the present invention. It will be understood, however, that alternative embodiments may comprise sub-combinations of the disclosed exemplary embodiments.

Additionally, readily established circuits of the exemplary embodiments may be disclosed in simplified form (e.g., block diagram style) to avoid obscuring an essence of the embodiments with excess detail.

Figure 1:
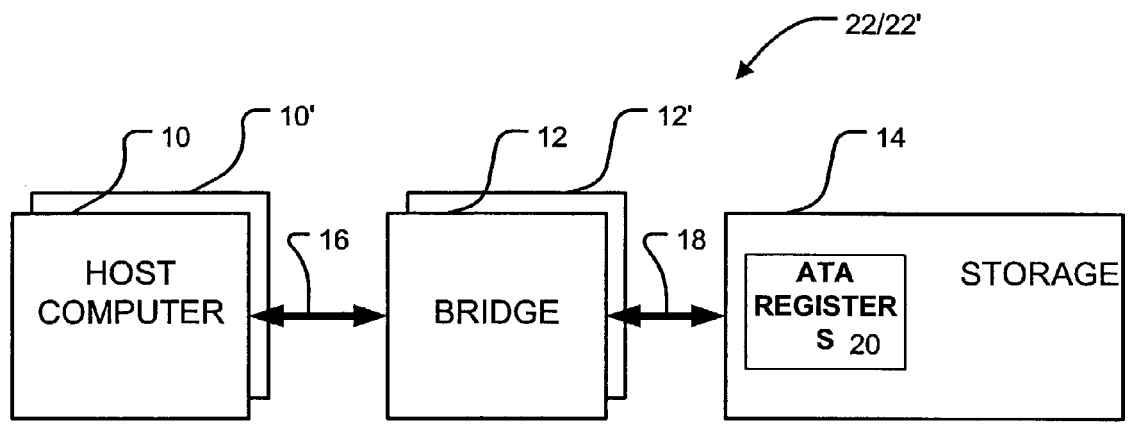
FIG. 1 is a schematic block diagram illustrating a system comprising a host communicating with a storage device through a bridge.

Again referencing FIG. 1, a data processing system 22' may comprise host 10' to communicate with storage device 14 by way of bridge-chip 12'. Host 10' may be coupled to bridge-chip 12' with a USB bus 16. Bridge-chip 12' may translate between the USB protocol of bus 16 and that of the second bus 18.

In a particular embodiment, bridge-chip 12' may translate between USB and ATA/ATAPI. For example, interface 18 may comprise an ATA/ATAPI interface of a conventional standard, e.g., ATA/ATAPI-6, NCITS Draft specification T13/1410D, Revision 3A, Dec. 14, 2001, available from the American National Standards Institute, and hereby incorporated by reference.

Further referencing FIG. 1, signals for creating read and writes may be established by a Basic Input/Output System (BIOS) of the Operating System (OS) of a host 10 or by some other Input/Output (I/O) master subsystem. Commands of the ATA/ATAPI protocol may be embedded within the USB communications. Typically, bridge-chip 12 may receive the USB communications and may parse-out the embedded ATA information to be forwarded to storage device 14.

The ATA specification provides a standard protocol for delivery of commands and data to and from storage devices. ATAPI-type transfers may include packets. For example, ATAPI-type devices, such as CD-ROM and tape devices may employ protocols of the ATAPI (ATA Packet Interface) and may use packet-delivered commands and data. In some data processing systems, available host drivers may allow use of intermediate transport protocols and media—e.g., such as those provided by USB—to allow connection of the host to a portable ATAPI device.

Figure 3:
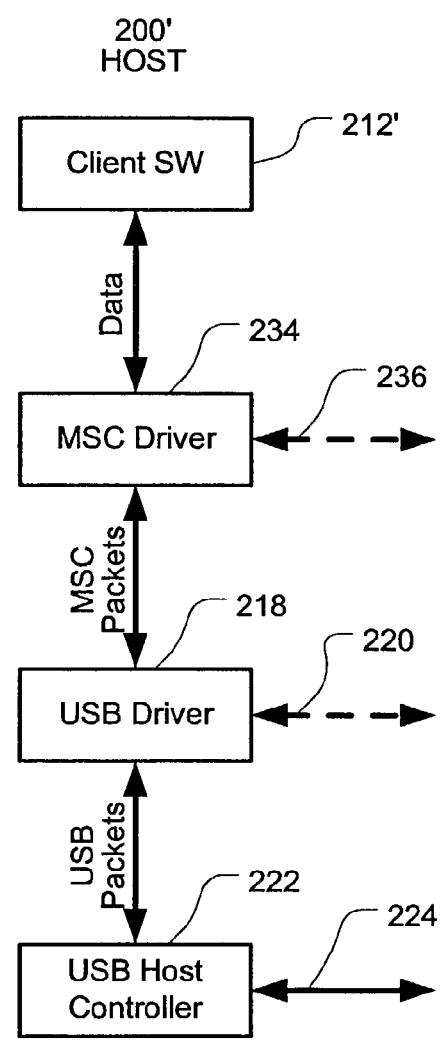
FIG. 3 is a layer diagram modeling a host with a mass storage class driver.

For example, further referencing FIGS. 1 and 3, a Mass Storage Class (MSC) driver 234 of a requesting master 200' (i.e., host 10 of FIG. 1) may act in accordance with a conventional "Universal Serial Bus Mass Storage Class—Bulk-Only Transport" specification (Rev. 1.0, USB Implementers Forum, Sep. 31, 1999, available from ANSI and hereby incorporated by reference) to allow transport of command, data and status information between bulk endpoints. According to this specification, a logical pipe (e.g., of a USB protocol) may be established between two USB endpoints. The pipe may be used to pass Mass Storage Class driver-formatted command and data packets between the devices.

Figure 4:
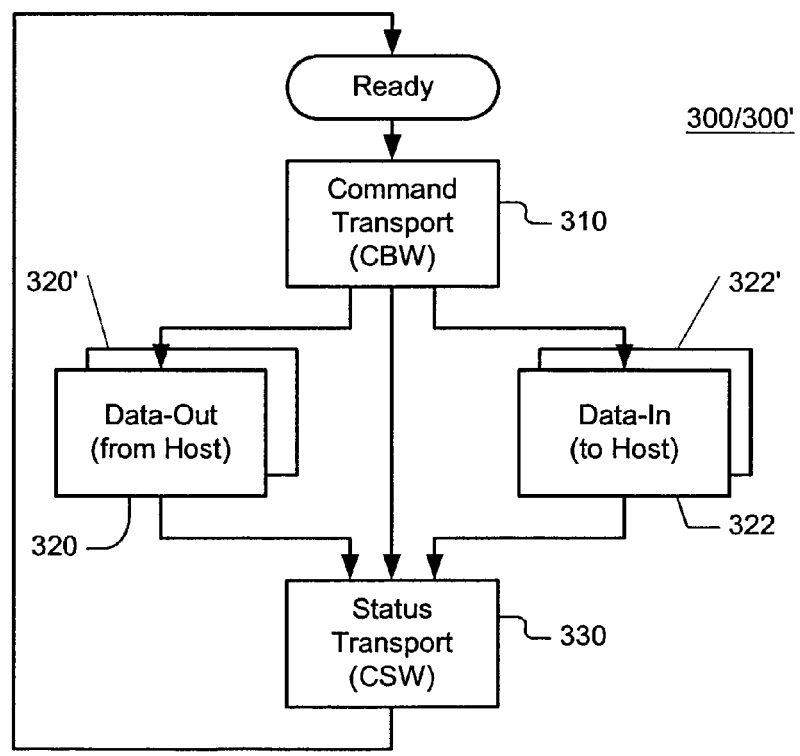
FIG. 4 is a simplified flow chart showing data transfer operations.
Figure 2:
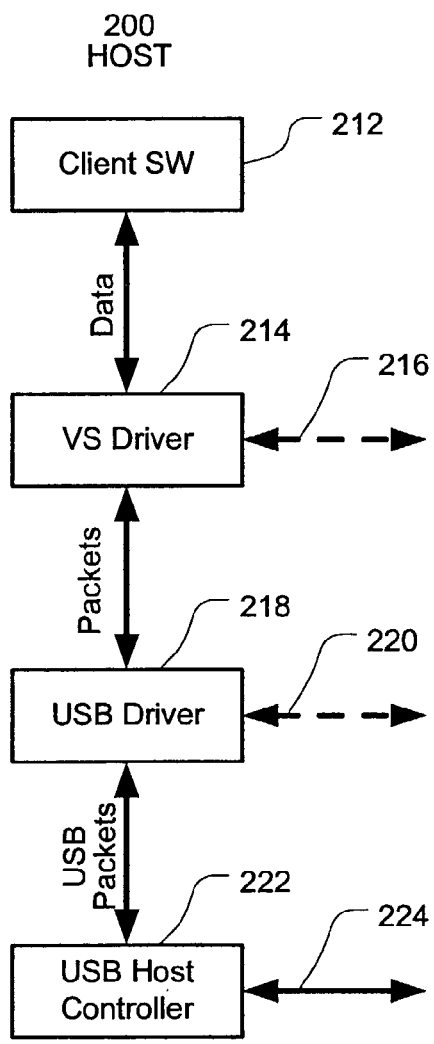
FIG. 2 is a layer diagram modeling a host with a vendor specific driver.

Conventionally, the mass storage command executions 300, referencing FIG. 4, may proceed along different avenues of the Mass Storage Class (MSC) driver. An ATAPI-type packet may be encapsulated 310 within a command block wrapper (CBW) of the MSC driver, which may then be forwarded to its logical end device. If the host is to write data, the data may be transferred-out 320 of the host across a bulk-out logical pipe 236 and to a logical device (e.g., storage 14 of FIG. 1) pre-established by the MSC driver. On the other hand, if the host is to read data, the data may be transferred-in 322, e.g., from a storage device, via a bulk-in logical pipe 236 as pre-established by the MSC driver. In further operation, the MSC logically configured device may return a command status wrapper (CSW) 330 to advise that the bulk transfer has been completed.

MSC drivers may be available from an operating system of a host. For example, a Windows™ type operating system may include Mass Storage Class drivers that can be used for the establishment of bulk-in/out pipes to assist the bulk data transfers.

Conventionally, the MSC driver may receive a bulk-type command or information of the USB Mass Storage Class—Bulk Only Transport to be acted upon. For example, the MSC driver 234 may receive a command block to write data. The MSC driver may then place the command block in a command block wrapper (CBW) which may then be sent to the pre-configured MSC logical device.

Conventionally, bridge-chip 12, upon receiving such CBW's would then begin handling the mass storage bulk transport to/from the ATA/ATAPI storage device. In this fashion, the bridge-chip may act as the USB-to-ATA interface or bridge to the ATA/ATAPI storage device, while also acting as the USB endpoint in accordance with the USB Mass Storage Class—Bulk Only Transport protocol.

In accordance with an exemplary embodiment of the present invention, a CBW may be configured with a command block, which may be made specific to the bridge-chip. Normally, the MSC protocol is used to send commands down through the bridge-chip to the ATA/ATAPI device. In this invention, however, information for the bridge-chip may be embedded inside of the MSC Command Block Wrapper 310, and in this embodiment, within the CBW Command Block (CBWCB). The bridge-chip 12' may be designed so that it may determine the signature and recognize that the information in the CBWCB of the MSC driver contains a bridge-chip specific command, which might then be used to access the bridge-chip's configuration or descriptor data.

In other words, a method of accessing the bridge-chip may use the available MSC driver(s) 234 of the host operating systems. By using the mass storage class driver and protocol, the command blocks within a CBW may be propagated by Bulk Only Transport operable devices. In this embodiment, the command block of the CBW may be received and interpreted at the bridge-chip. But rather than passing a storage type operative to the Mass storage device 14, the bridge-chip may intercept and interpret the command block as being directed to it. The bridge-chip may then operate internally in accordance with the command of the command block identifiable thereto. Accordingly, there is no longer a need for a Vendor Specific driver. Instead, a software application (i.e. Client SW) can interact with the existing MSC driver, which is already supported by the operating system.

Referencing FIG. 4, the Data-Out or Data-In operatives of the mass storage command executions 300 may be associated directly with bridge-chip 12 (FIG. 1). In this sense, the Data-In and Data-Out operatives 320', 322' of this embodiment may encompass conventional mass storage class procedures, and additionally, may also include procedures individually operable by bridge-chip 12.

TABLE 1

| Byte | bit | | | | | | | |
|---|---|---|---|---|---|---|---|---|
| | 7 | 6 | 5 | 4 | 3 | 2 | 1 | 0 |
| 0–3 | dCBWSignature | | | | | | | |
| 4–7 | dCBWTag | | | | | | | |
| 8–11 (08h–0Bh) | dCBWDataTransferLength | | | | | | | |
| 12 (0Ch) | bmCBWFlags | | | | | | | |
| 13 (0Dh) | Reserved (0) | | | | bCBWLUN | | | |
| 14 (0Eh) | Reserved (0) | | | | bCBWCBLength | | | |
| 15–30 (0Fh–1Eh) | CBWCB | | | | | | | |

Referencing TABLE 1 above, an exemplary command block wrapper (CBW) includes a Command Block Wrapper Command Block (CBWCB) in bytes 15–30. The command block is to be implemented by the USB device in accordance with the respective bulk-transport standard or protocol. In accordance with an embodiment of the present invention, the CBWCB may be formed as a configuration control block (CFGCB), e.g., for requesting a read or load configuration of a USB device. In accordance with particular embodiments, the CFGCB may be formed with a format of TABLE 2 below. In this way, the operation may access the chip-configuration and descriptor data separately from conventional USB operations. This may be helpful, e.g., to determine the information that may be available so that the chip might configure itself during a power-up or reset.

TABLE 2

| Byte | 7 | 6 | 5 | 4 | 3 | 2 | 1 | 0 |
|---|---|---|---|---|---|---|---|---|
| 0 | bVSCBSignature (set in configuration bytes) | | | | | | | |
| 1 | bVSCBSubCommand (hardcoded 0x26) | | | | | | | |
| 2 | Reserved (must be zero) | | | | | | | |
| 3 | Data Source | | | | | | | |
| 4 | Start Address (LSB) | | | | | | | |
| 5 | Start Address (MSB) | | | | | | | |
| 6–15 | Reserved | | | | | | | |

In a particular exemplary embodiment, a vendor specific code block signature may be provided in byte 0 of the CFGCB to establish a request designator that is specific to the bridge-chip. In some instances, this value may be configurable or programmable and may be retained with the configuration data. The next byte of the CFGCB may be set to a vendor specific subcommand value that may match a hardcoded value pre-determined to designate the specific chip. The specific subcommand value may identify the command block as a configuration type code block appropriate for the chip. Byte 2, in this embodiment for a configuration read or load, may be given a value of zero, e.g., to avoid perhaps triggering other vendor-specific routines (which may be further described herein below). Continuing with this embodiment, the data source information of byte 3 may establish a memory (i.e., type or source) to be read/loaded for reading/loading the configuration data.

For example, some embodiments may keep the configuration information in one of a variety of possible locations. It may be retained in an external EEPROM, or an external memory media of a memory drive, or within an internal ROM. A memory interface module (e.g., a ROMIF) of the bridge-chip may determine this information of the CFGCB to establish the particular memory source for storing/retrieving the configuration information. Additionally, the ROMIF may use the start address information of bytes 4–5 to designate the specific address locations of the medium by which to begin writing or storing the configuration information.

Once bridge-chip receives a CBW (410–420 of FIG. 5) and determines a CFGCB 430 per the vendor specific code block signature (e.g., byte 0) and the vendor specific code block subcommand (e.g., byte 1) matching 450 the chip's hardcoded value (e.g., 0x26), the bridge-chip may then perform the chip-specific configuration load or read 460 dependent on the CFGCB.

In a particular exemplary embodiment, the configuration load Data Source (i.e., cfg write) may comprise values of, e.g.

0x0000 Configuration bytes, with an address range 0x2–0x32

0x0002 External programmable memory device (e.g., EEPROM)

0x0003 vendor specific identified RAM (for testing purposes)

Values that may be associated with the Data Source for a configuration read (i.e., cfg_read) may include the following:

0xOOOO Configuration bytes, address range 0x0–0x32 only

0x0001 Internal ROM

0x0002 External programmable memory device

0x0003 vendor specific identified RAM

Figure 5:
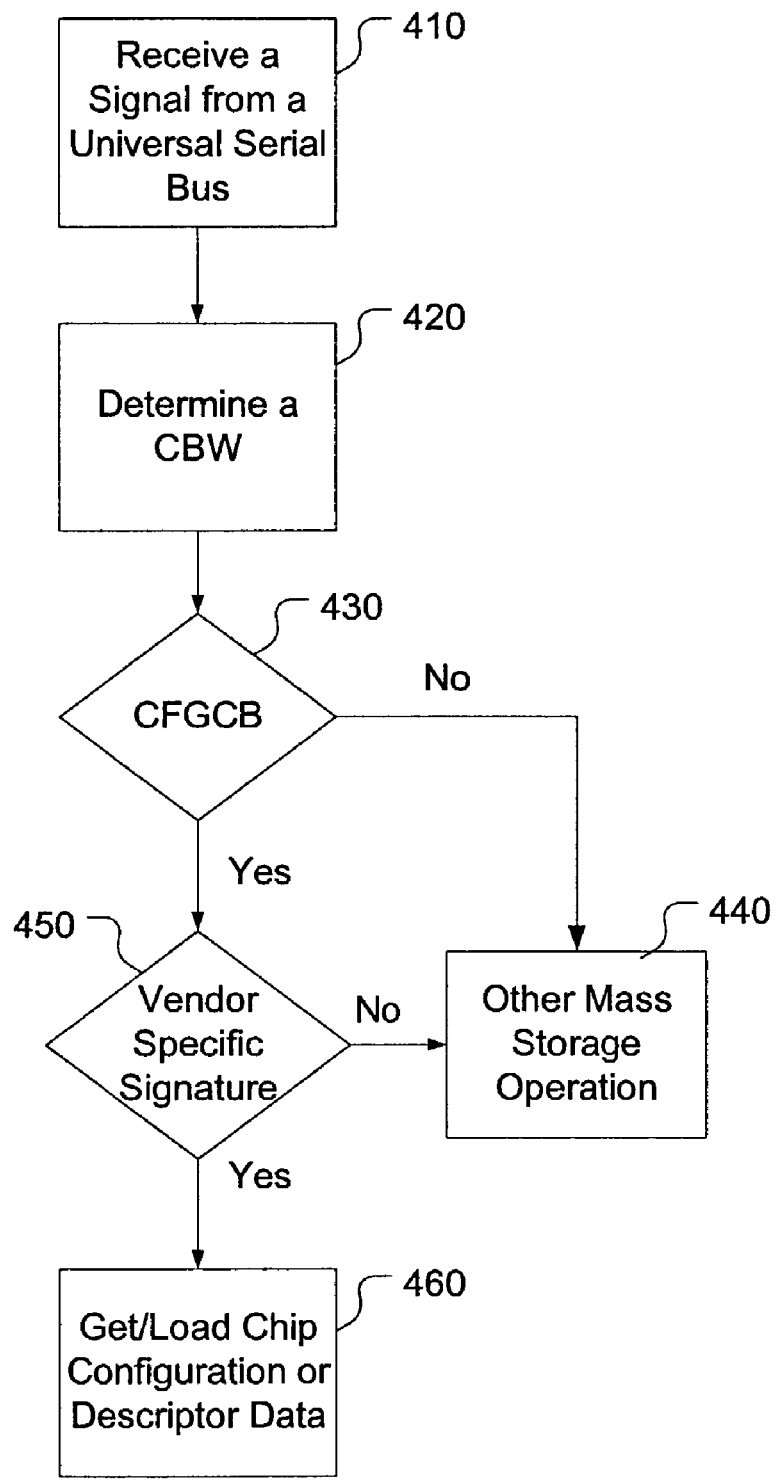
FIG. 5 is a flow chart of an exemplary method of operating a bridge-chip.

In accordance with an alternative exemplary method of operation, in addition to accessing the configuration information, the descriptor information of the bridge-chip may also be accessed (460 of FIG. 5). Again, a mass storage class driver of the host's operating system may be fed information to configure a CBW with a CBWCB having a CFGCB structure, e.g., of TABLE 3 below.

TABLE 3

| Byte | 7 | 6 | 5 | 4 | 3 | 2 | 1 | 0 |
|---|---|---|---|---|---|---|---|---|
| 0 | bVSCBSignature (set in configuration bytes) | | | | | | | |
| 1 | bVSCBSubCommand (hardcoded 0x26) | | | | | | | |
| 2 | Descriptor Type | | | | | | | |
| 3 | Descriptor Index | | | | | | | |
| 4 | Windex (LSB) | | | | | | | |
| 5 | Windex (MSB) | | | | | | | |
| 6–15 | Reserved | | | | | | | |

In this particular example, the vendor specific code block signature of byte 0 may be configured to establish a specific request designator of the chip. Again, in certain embodiments, the specific value for the chip may be configurable and retained with its configuration data. The next byte of the CFGCB for this descriptor operative embodiment, may be set to match a hardcoded value, e.g., 0x26, of the chip, so as to identify the configuration command block as being specific to the chip. Byte 2 may receive a value to select a descriptor operation.

In particular embodiments, the descriptor type may be configured with values identified as follows:

| | |
|---|---|
| 0x01 | Device Descriptor |
| 0x02 | Configuration Descriptor |
| 0x03 | String Descriptor |
| 0x06 | Device Qualifier Descriptor |
| 0x07 | Other Speed Configuration Descriptor |

Bytes 4 and 5 may establish the index fields to establish the language identifications for string type descriptors. Otherwise, it may be set to zero.

Once bridge-chip receives (410 of FIG. 5) a CBW and deciphers (430–440 of FIG. 5) a CFGCB per the vendor specific code block signature (e.g., byte 0) and the vendor specific code block subcommand (e.g., byte 1 with a value matching the chip's hardcoded value 0x26), the bridge-chip may decipher and perform (460 of FIG. 5) a descriptor operative (e.g., get_desc) of bytes 3–5 when specified therein.

Thus, even though the host may not be setting-up the bus, the descriptor and configuration information of the bridge-chip may be determined by using available MSC drivers of a host operating system for delivering CFGCB as described above.

MSC drivers are already available as a part of the host operating system. The exemplary embodiments package CFGCB's that may be carried by CBW structures of available mass storage protocols. Thus, vendor specific SW drivers do not have to be developed or distributed for enabling access of a bridging-chip's descriptor and configuration data. Instead, configuration code blocks (of vendor specific formats) may be passed to existing MSC drivers that may then structure code block wrappers (CBW) that may be received and deciphered by the bridge-chip.

It will be understood that the bridge-chip 12 may be preconfigured with descriptor data and/or configuration data. Additionally, bridge-chip is to be operable to parse-out and perform the vendor specific signatures and subcommands that have been described above. In one exemplary embodiment, the descriptor and configuration information for the bridge-chip may be retained in external programmable memory, e.g., such as an external EEPROM. In other embodiments, the descriptor and configuration data may be retained in external memory of a drive device or an internal ROM that has been pre-configured. For these embodiments, a ROMIF (for ROM InterFacing) procedure or operable state-machine may serve to retrieve the descriptor and configuration data from one of the possible sources dependent on a configuration mode of the bridge-chip.

In a particular mode, for example, the bridge-chip may retrieve the descriptor and configuration data from an external drive. In separate procedures, this information might also be loaded into an internal RAM of the bridge-chip circuit associated with, e.g., the USB interfacing. In another mode, an external EEPROM may retain the descriptor and configuration data that is to be retrieved and loaded into the internal RAM. And in a further mode, the information may be contained in an internal ROM.

The embodiments allowing storage and retrieval of the descriptor and configuration information in an external memory or programmable memory may provide greater flexibility in chip performance. For example, the chip might thus be able to have its configuration and operating mode re-configurable after a power-up to obtain an alternative operative mode other than that which may be fixed within the internal ROM.

After power-up, a host controller may query the chip to determine its USB descriptor and configuration information. The host may use a USB driver to issue a variety of commands which may include, e.g., GET_CONFIGURATION, GET_DESCRIPTOR, GET_STATUS, SET_ADDRESS, SET_CONFIGURATION, SET_DESCRIPTOR, etc., as may be set forth by the USB interface standard. The USB devices may reply to report their attributes of descriptor, configuration, and address information.

But as noted above, the chip's descriptor or configuration might be separately accessed independent of the USB configuration. According, these parameters of the bridge-chip may be dealt with independent of the USB operations.

Again, this configuration information of the bridge-chip may be referenced as the "chip-configuration-data"; which may be contrasted with the "USB configuration data" dealt with during the USB configuration procedures. The chip-configuration-data may help obtain alternative USB driver interactions, and also may allow the chip to reconfigure its operating mode.

For example, the descriptor and configuration information might be used to make determinations involving its power requirement and mode of operations. Additionally, if an application should determine an available operating mode that is not being used, then it may perform a mode change before initiating subsequent procedures. For example, a controller host may perform a chip descriptor or configuration request and learn that a specific option (e.g., UDMA-4 versus UDMA-2) may be turned-off or is not being used. To change a mode condition, the host may issue a configuration request to change, e.g., configuration data of an external EEPROM.

Certain embodiments above may have been characterized with reference to chip-specific descriptor or configuration operations. It will be understood, however, that further embodiments may perform operations within a bridge-chip other than the chip-specific descriptor and configuration procedures. Such bridge-chip may be operable to perform chip-specific procedures dependent on the pre-structured CFGCB, responsive to recognizing a signature specific thereto. For example, the bridge-chip may be operable to recognize a vendor specific signature of the structured CFGCB, and responsive to recognizing the vendor specific signature, operate internally dependent on the information of the structured CFGCB.

It will be apparent to those skilled in this art that the illustrated embodiments are exemplary and that various changes and modifications may be made thereto as become apparent upon reading of the present disclosure. Accordingly, such changes and modifications are considered to fall within the scope of the appended claims.

For example, the above disclosure may describe a specific example of testing of a bridge-chip having an ATA/ATAPI type mass-storage interface, the methods may also be appropriate for testing of alternative chips, devices or software systems associated with interfacing mass-storage drives. Additionally, the scope of the present invention may extend to an apparatus comprising a computer-readable medium containing computer instructions that, when executed, cause a processor or multiple communicating processors to perform one of the described test methods.

Further, the specification may refer to "an", "one", "another", or "some" embodiment(s) in various locations. It will be understood, however, that such use does not necessarily mean that each such reference is directed to the same embodiment(s), or that the features thereof only apply to a single embodiment.

What is claimed is:

1. A method of integrated circuit operation, comprising:
    extracting a pre-identified signature and at least one USB device request from a mass storage class signal received over a universal serial bus (USB), the mass storage class signal including both the pre-identified signature and the USB device request, where the USB device request is a request for the integrated circuit and is separate from the pre-identified signature; and
    determining the USB device request is a request for the integrated circuit responsive to the pre-identified signature, the pre-identified signature uniquely identifying the integrated circuit.

2. The method according to claim 1, further comprising determining a descriptor for each request of the integrated circuit responsive to the determining of the pre-identified signature.

3. The method according to claim 1, further comprising:
    using a mass storage class driver to configure a code block wrapper (CBW) with a configuration code block (CFGCB) and to send it to the integrated circuit over a USB interface.

4. The method according to claim 3, where the CFGCB positions the pre-identified signature and an associated sub-command to occupy at least the first two bytes of the CFGCB.

5. The method according to claim 4, in which the CFGCB is configured as a code block wrapper command block (CBWCB) of the code block wrapper (CBW) of a USB mass storage class bulk only transport protocol.

6. A storage interface comprising:
    a host having a driver to a universal serial bus (USB); and
    a bridge-chip to bridge the USB bus to a storage device, where the bridge-chip and the driver are coupled via the USB;
    where the driver is operable to structure a command block wrapper (CBW) of a mass storage class protocol;
    where the CBW includes a configuration code block (CFGCB) having a predetermined signature uniquely identifying the bridge-chip and a USB device request separate from the predetermined signature; and
    where the driver is operable to drive the USB bus to send a USB signal that includes the CBW having the structured CFGCB, the USB signal including both the predetermined signature and the USB device request, the predetermined signature to indicate to the bridge-chip that the USB signal includes the USB device request.

7. The storage interface according to claim 6, the bridge-chip comprising one of an advance technology attachment (ATA) or advance technology attachment packet interface (ATAPI) type interface to the storage and operable to translate between the USB bus and the ATA/ATAPI interface.

8. The storage interface according to claim 6, in which the bridge-chip is operable to identify a vendor specific signature of the structured CFGCB, and
    responsive to identifying the vendor specific signature, operate internally dependent on the CFGCB.

9. The storage interface according to claim 8, in response to an input request, the driver structures the USB device request from a group consisting of a configuration load, configuration read or a descriptor request together with the CFGCB.

10. The storage interface according to claim 9, in which the driver is operable to structure the CFGCB as a code block wrapper command block (CBWCB) of a code block wrapper (CBW) of a USB mass storage class bulk only transport protocol.

11. The storage interface according to claim 10, further comprising memory to contain information to load into configuration and descriptor registers.

12. The storage interface according to claim 11, in which the memory comprises at least one of the group consisting of external programmable memory, internal memory, and a portion of a storage device interfaced hereby.

13. The storage interface according to claim 10, the bridge-chip further operable to execute the command of a structured CFGCB upon determining a vendor specific command block signature of the CFGCB that matches a predetermined identity of the bridge-chip.

14. The storage interface according to claim 13, the bridge-chip further operable to perform at least one of a configuration or descriptor operation based on the command of the CFGCB.

15. The storage interface according to claim 6, in which the driver is a mass storage class driver.

16. A method of operating a vendor specific bridge-chip, comprising:
    configuring a configuration code block (CFGCB) with a vendor signature uniquely identifying the bridge-chip and a USB device request for the bridge-chip separate from the vendor signature, the bridge-chip capable of translating data between a universal serial bus (USB) interface and a non-USB interface; and
    accessing the bridge-chip with a USB signal including a command block wrapper (CBW) of mass storage class protocol that includes the configured CFGCB, the USB signal including both the vendor signature and the USB device request, the vendor signature to indicate to the bridge-chip that the USB signal includes the USB device request.

17. The method according to claim 16, further comprising configuring the CFGCB with the USB device request for performing one of configuration read, configuration load or a descriptor request of the bridge-chip.

18. The method according to claim 17, configuring the CFGCB within a CBW of a mass storage bulk only transport protocol.

19. The method according to claim 17, sending the signal with the configured CFGCB to the bridge-chip over the USB interface.

20. The method according to claim 19, further comprising using a mass storage class driver of a host operating system to configure the CFGCB as part of a CBW and to drive the USB interface with the configured CBW.

21. A method comprising:
    configuring a configuration code block (CFGCB) with a pre-identified signature uniquely identifying a bridge and at least one request for the bridge separate from the pre-identified signature; and using a mass storage class driver to configure a code block wrapper (CBW) with the CFGCB and to send the CBW to the bridge over a universal serial bus (USB), the CBW including both the pre-identified signature and the request for the bridge, the pre-identified signature to indicate to the bridge that the CBW includes the request.

22. The method according to claim 21, where the CFGCB positions the pre-identified signature and an associated sub-command to occupy at least the first two bytes of the CFGCB.

23. The method according to claim 22, in which the CFGCB is configured as a code block wrapper command block (CBWCB) of the code block wrapper (CBW) of a USB mass storage class bulk only transport protocol.

24. The method according to claim 3, further comprising determining configuration data for each request of the integrated circuit responsive to the determining of the pre-identified signature and the CFGCB.

* * * * *